United States Patent [19]

Clifford

[11] Patent Number: 4,532,036
[45] Date of Patent: Jul. 30, 1985

[54] SELF-CLEANING FILTERING APPARATUS

[75] Inventor: Graham F. Clifford, Stanley, N.C.

[73] Assignee: Gaston County Dyeing Machine Company, Stanley, N.C.

[21] Appl. No.: 550,948

[22] Filed: Nov. 14, 1983

[51] Int. Cl.³ .................. B01D 23/00; B01D 23/04
[52] U.S. Cl. ..................... 210/167; 68/18 F
[58] Field of Search ............ 210/167, 108, 407, 413, 210/414, 333.01, 195.1, 195.3, 196; 68/18 F, 177, 178

[56] References Cited

U.S. PATENT DOCUMENTS

| | | | |
|---|---|---|---|
| 527,187 | 10/1894 | Wiley | 210/196 |
| 1,906,391 | 5/1933 | McKinley | 210/413 |
| 2,828,862 | 4/1958 | Johnson | 210/167 |
| 3,253,431 | 5/1966 | Minhinnett | 210/196 |
| 3,421,835 | 1/1969 | McCarty | 210/167 |
| 3,994,810 | 11/1976 | Schaeffer | 210/108 |
| 4,083,208 | 4/1978 | Ekstroem | 68/178 |
| 4,143,527 | 3/1979 | Trullás | 68/18 F |

Primary Examiner—Marc L. Caroff
Assistant Examiner—Sharon T. Cohen
Attorney, Agent, or Firm—Richards, Shefte & Pinckney

[57] ABSTRACT

A self-cleaning filtering apparatus for use in a material treating system of the type in which treating fluid is recirculated through a treating vessel. The apparatus includes a filtering chamber through which treating fluid flows from a pump to a heat exchanger. A cylindrical perforated filter element in the chamber filters particulate contaminant, such as lint in a textile processing system, onto the element, and a reciprocating cleaning member cleans the contaminant from the surface of the filter element by drawing fluid through an annular slot in a head of the cleaning member, with the fluid being drawn across and through the filter element to remove contaminant therefrom. The contaminant containing fluid is conveyed from the cleaning member back into the treating vessel where it is discharged into a large fabric bag that allows the fluid to filter through into the vessel and obstructs the contaminant for collection in the bag.

21 Claims, 6 Drawing Figures

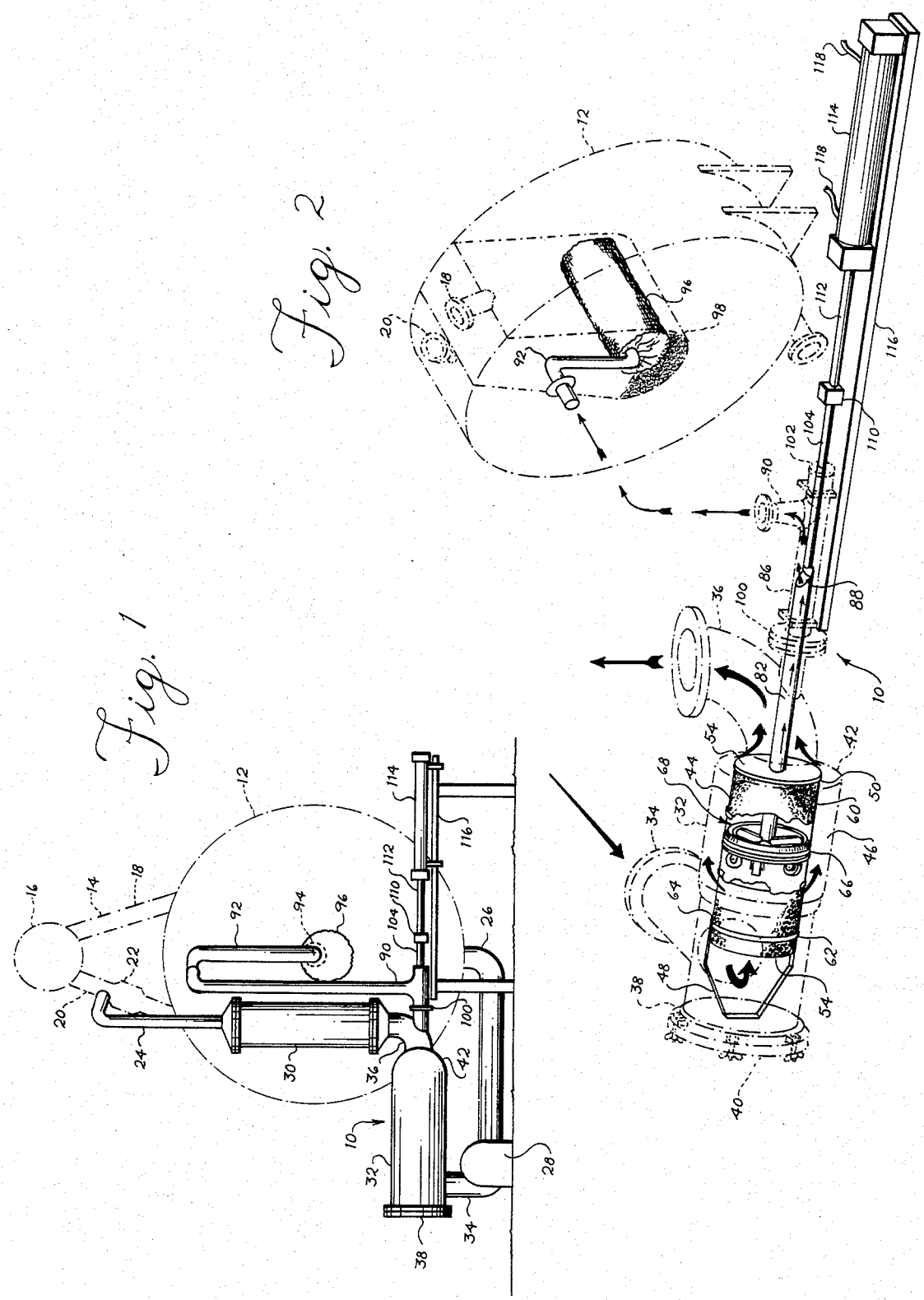

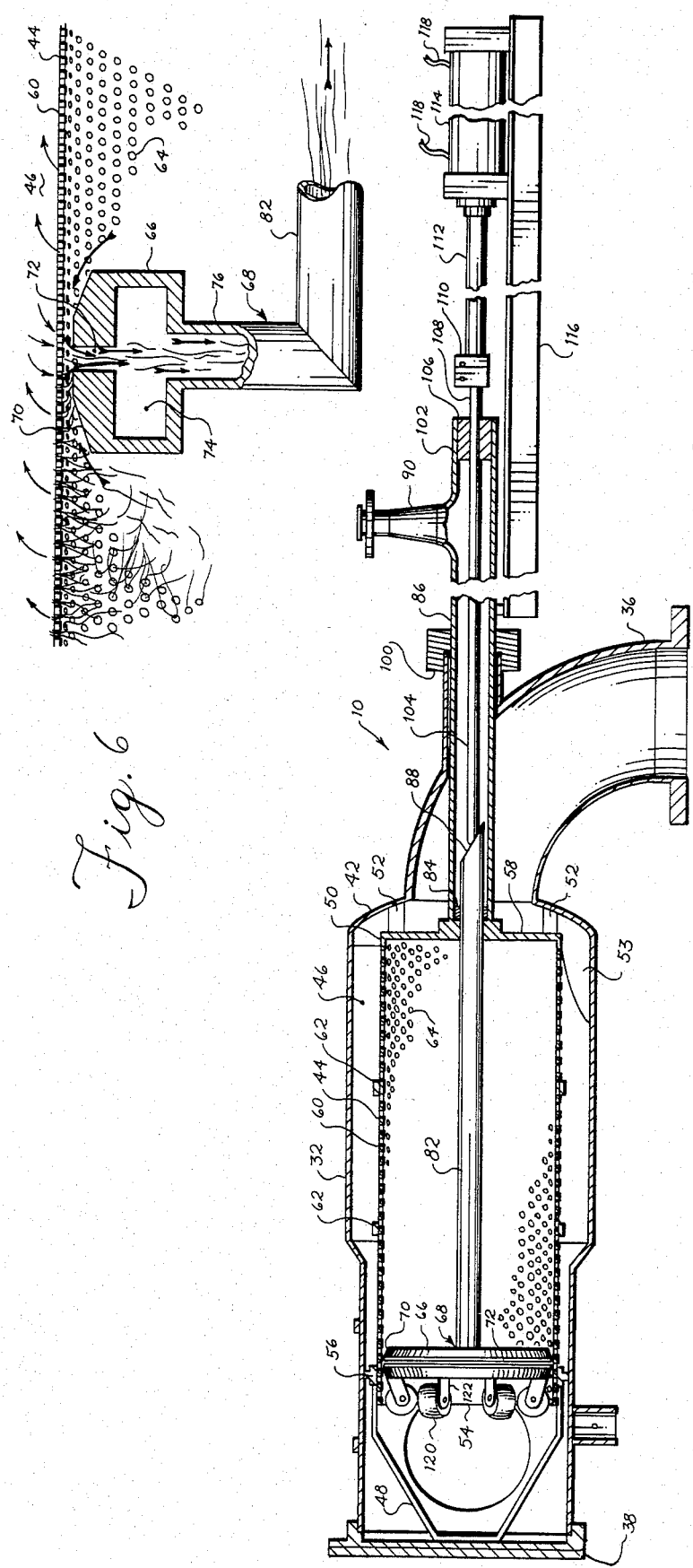

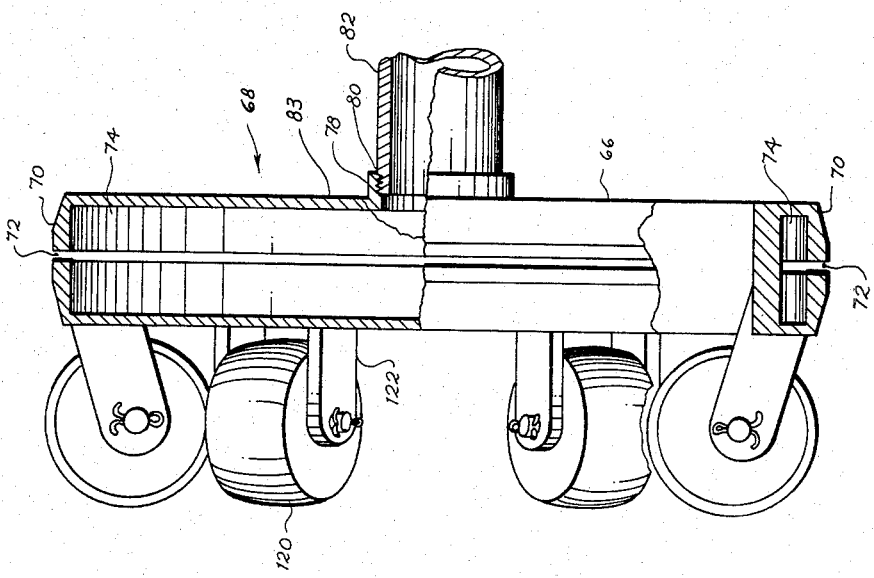
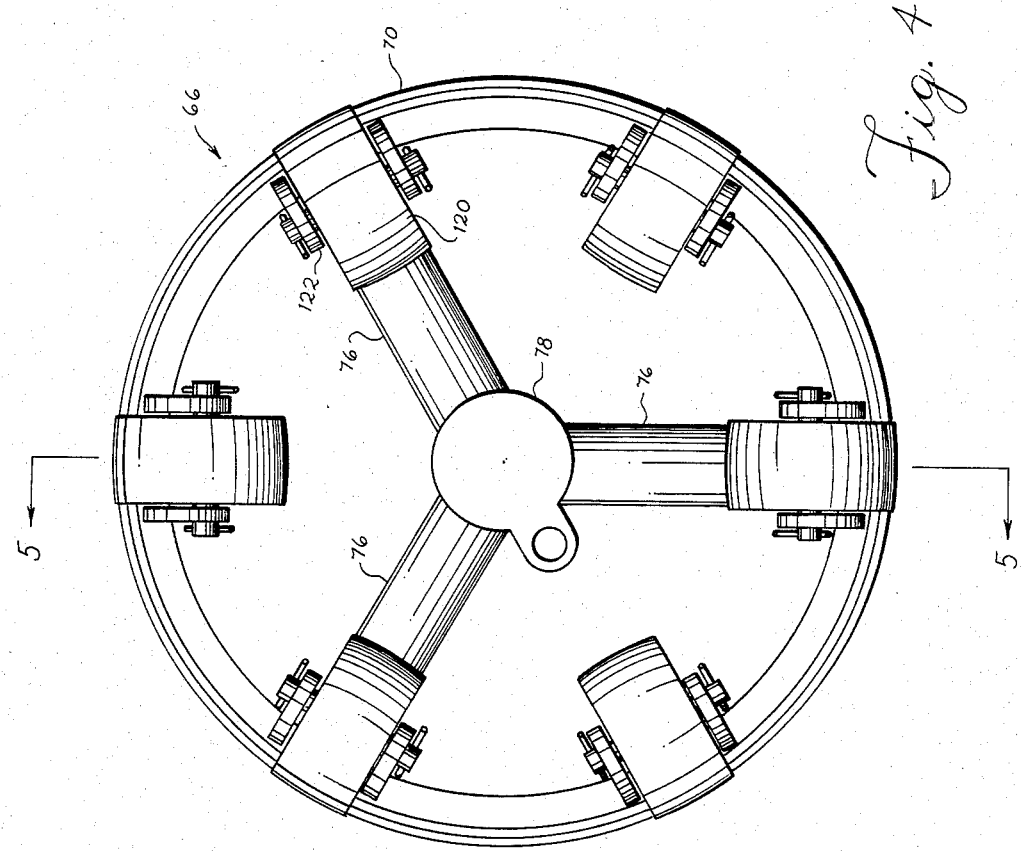

SELF-CLEANING FILTERING APPARATUS

BACKGROUND OF THE INVENTION

The present invention relates to a self-cleaning filtering apparatus for use in a material treating system of the type having a vessel in which material is subjected to treatment by fluid that is recirculated and conditioned for re-use, and more particularly the present invention relates to a self-cleaning filtering apparatus of this type in which the contaminant containing fluid from the self-cleaning function is itself filtered by discharge through a collector and back into the circulating fluid.

In many material treatment applications where material is subjected to treatment by a circulating flow of fluid that is recirculated and conditioned for re-use, the material being treated creates undesirable contaminants in the fluid being circulated, which necessitates the use of some kind of filter. However, in many such applications, the quantity of contaminant accumulating as a result of the filtering operation has the undesirable effect of clogging the system or significantly reducing the ability of the fluid to flow effectively through the application without close attention to and undesirable changing of the filter material during operation of the apparatus.

This problem of contaminant buildup in a recirculating treatment system is of particular concern in textile processing systems that inherently produce lint as a particulate contaminant in the recirculating treating fluid. For example, in piece dyeing machines the fluid is passed through the fabric or the fabric is passed through the liquid to effect dyeing and this inherently causes considerable agitation of the fabric. Further, it is common for the fabric to be continuously re-aligned to avoid recurring setting of folds that could cause creases or crush marks. For these reasons, piece dyeing systems commonly are provided with transport reels for moving the fabric by frictional contact and with jets or overflow boxes for moving the fabric and to create the fluid interchange with the fabric by velocity differences as the fabric travels through the system. The greater the difference in reel velocity and fabric velocity, or liquor velocity and fabric velocity, the greater will be the tendency for the fabric to shed lint.

Once in the circulating system, the lint will tend to clog the system, starting with the points of greatest restriction to flow. In many cases, these will be the jet orifices. As the area of the orifice is reduced by lint build-up, the velocity increases, thus increasing the tendency to shed lint. Simultaneously, the volume of liquor passing through the jet is reduced by the increased restriction, and the fabric tends to slow down, thus increasing the relative speed through the fluid and the fabric, and between the driven reel and the fabric, thereby increasing further the amount of lint given up by the fabric. The net result of all of this is a very drastic reduction in the dyeing efficiency of the system and a corresponding reduction in the quality of the goods being processed. With some fabrics it would be impossible to perform satisfactory dyeing without some means of removing the lint from the circulating fluid without prolonging the dyeing process to an economically prohibitive length.

The traditional attempt at solution to this problem has been to incorporate a filter into the circulating system. For example, filters have been used consisting of enlarged cylindrical sections in the recirculating system containing one or more perforated cylindrical filter elements at a selected location in the system, such as at the point of discharge from a circulating pump and prior to flow through the heat exchanger back into the vessel in which the dyeing takes place, thereby protecting the heat exchanger, valves, jets and other downstream components from the effect of lint in the circulating fluid.

Even with such filtering apparatus, piece dyeing systems require skill and diligent attention on the part of the operator because the vital and delicate balance between the traction provided by the jet and the traction provided by the reel is being continually upset at the filter accumulates lint and alters its resistance to fluid flow. As the dye cycle progresses it is not uncommon for the rate of flow of circulating fluid to be reduced to half of its original rate and in extreme cases for it to reduce to a mere trickle, and to render the machine, if not unusable, then uneconomical as all performance criteria, e.g. rate of temperature rise, rate of bath circulation, rate of cooling, rate of washing, are similarly reduced. At the same time, the undesirable effects of reel slippage on the fabric quality are taking place. Furthermore, even where the filters do not accumulate enough lint to affect pump performance, a small amount of lint remaining in the filter could result in color contamination if the next dyeing cycle will be performing a dyeing of a lighter shade.

A further significant problem is that of cleaning of the filters between cycles to remove the lint that has accumulated. In some instances textile fabric bags are used for the filter material, which may be thrown away and replaced by clean bags, but are otherwise susceptible to the same problems during operation as described above and are not as capable of handling the large flow of fluid as perforated sheet metal or wire mesh screens that suffer from the problem of cleaning between cycles. With perforated sheet metal or wire mesh screens, the lint tends to straddle the ridges between the holes, and the ends of the fibers of lint tend to knot on the opposite side. The appearance of a clogged screen is of a layer of felt on both sides, or of a thick mass of felt with the screen material buried in the center. Because of the turbulence from the flow of fluid the lint fibers are often firmly locked together. Cleaning the filter often involves vigorous scrubbing with a wire brush and may even require the material to be burned off with a blowtorch.

However, this locking and felting process is not instantaneous, and can be prevented entirely if the lint is removed as soon as it is trapped. It is, therefore, desirable that the lint should be removed from the circulating system on a continuous basis as it is produced during operation so that it is not permitted to cause the effects described above.

Self-cleaning filtering apparatus are known in the prior art in applications other than textile processing. For example, U.S. Pat. No. 3,994,810 discloses an on-stream backflush filter in which a cylindrical filter element is continuously cleaned during operation by an annular head that reciprocates across the interior surface of the cylindrical filter element and has a peripheral opening and interior passage for flow of fluid containing the contaminant that is being cleaned from the interior surface of the cylindrical filter element to a discharge location, such as a drain, exteriorly of the apparatus. As the contaminant containing fluid being backflushed in the self-cleaning operation is discharged from the apparatus, this prior art type filter is not practical for use in a system in which the fluid is recycled and conditioned without undesirably having to periodically add fluid or components to the system to make up for that discharged in the backflushing.

In contrast, the present invention provides a self-cleaning filtering apparatus that can be effectively in a material treating system in which a treating fluid is recirculated and conditioned.

SUMMARY OF THE INVENTION

Briefly described, the present invention provides a self-cleaning filtering apparatus for use in a material treating system of the type having a vessel in which material is subjected to treatment by fluid that is recirculated and conditioned for re-use.

The apparatus includes a filtering chamber disposed in the fluid circulating and conditioning means of the system for circulation of fluid through the chamber. A filter element is disposed in the chamber for passage of the fluid through the filter element to filter particulate contaminants from the fluid onto the filter element. A cleaning member is disposed adjacent the filter element and has a pssage therein with an opening facing the filter element. Means are provided for traversing the cleaning member across the upstream surface of the filter element to allow particulate contaminants on the filter element to flow into the opening and passage of the cleaning member, thereby cleaning contaminants from the filter element. Conduits means communicate with the passage and with the interior of the vessel for passage of the contaminant containing fluid through the cleaning member and conduit means and into the vessel. A contaminant collector is disposed in the vessel and is connected to the conduit means for discharge thereinto of the contaminant containing fluid. The collector is fluid-permeable and substantially contaminant impermeable for passage of fluid therethrough into the vessel and for collection of contaminants in the collector. With this arrangement self-cleaning of the filtering apparatus is obtained with the fluid used in the self-cleaning being returned to the treating vessel for recirculation with the portion of the fluid that has passed through the filter element and been reconditioned, thereby there is no depletion of the total amount of fluid that is being recirculated and conditioned so that no make-up need be added to compensate for the self-cleaning action. Of course, as the collector is not cleaned during operation, there could come a time when the collector is filled to capacity with contaminant, but the amount of flow of the cleaning portion of the fluid need be only a fraction of the total fluid flow and the collector can be sufficiently large in relation to the amount of the contaminant that a full treating cycle or cycles can be performed in most applications before the collector is filled to capacity with contaminant.

In most material treating sysftems of this type the fluid must be subjected to pressure to create flow such that the pressure during recirculating and conditioning is greater than the pressure within the vessel and this pressure differential can be utilized to create the self-cleaning flow through the cleaning member into the vessel without requiring any additional pump or other means for creating cleaning flow.

The collector may be in the form of a bag of flaccid material having an opening into which the conduit means discharges the contaminant containing fluid. This bag may be a disposable bag of textile fabric material. With this bag-type collector, an inexpensive disposable member can be utilized with ease of handling and of a capacity sufficient to function effectively through an entire treatment cycle.

In the preferred embodiment, the material treating system is a textile processing system that inherently produces lint as a particulate contaminant in the recirculating treating fluid. The filter element is perforated to permit passage of fluid therethrough and to obstruct passage of lint, and the collector is a disposable bag of textile fabric material that can be disposed of at the end of a processing cycle and replaced by a clean bag.

Structurally, the preferred embodiment of the present invention utilizes a filter element that is cylindrical and has an open end through which contaminant containing fluid flows into the interior of the element for filtering passage of fluid though the cylindrical surface into the chamber exteriorly of the element with the contaminant retained on the element. The cleaning member includes an annular head having an annular peripheral surface facing and closely adjacent the interior of the cylindrical filter element and having an axially extending tube connected to the head and extending exteriorly of the chamber for reciprocating actuation by the traversing means. The opening in the cleaning member is provided in the peripheral surface of the head and the passage is formed in the tube and communicating with the opening for flow of the contaminant containing fluid through the opening and passage to the conduit means exteriorly of the chamber. Preferably, the filtering chamber and the means for traversing are disposed exteriorly of the vessel, and the conduit means extends into the vessel to the interiorly disposed collector.

BRIEF DESCRIPTION OF THE DRAWINGS

FIG. 1 is an elevation of a material treating system in which the self-cleaning filtering apparatus of the preferred embodiment of the present invention has been incorporated;

FIG. 2 is a perspective view, partially broken away, illustrating the self-cleaning filtering apparatus of FIG. 1;

FIG. 3 is a vertical section as viewed along the axis of the self-cleaning filtering apparatus of the preceding Figures;

FIG. 4 is an enlarged end elevation of the head of the cleaning member of the self-cleaning filtering apparatus of the preceding Figures;

FIG. 5 is an enlarged vertical section of the head of the cleaning member, as viewed along lines 5—5 of FIG. 4; and FIG. 6 is an enlarged section of a portion of the head of the cleaning member and adjacent filtering element.

DETAILED DESCRIPTION OF THE PREFERRED EMBODIMENT

While the present invention is applicable to many material treating systems, the preferred embodiment is particularly applicable to textile processing systems such as piece dyeing machines, and for the purpose of illustration, the preferred embodiment is disclosed and described herein incorporated in such a piece dyeing machine.

Referring to the accompanying drawings, the self-cleaning apparatus 10 of the present invention is shown as mounted exteriorly of the large kier or vessel 12 of a textile piece dyeing machine in which a continuous cloth rope is circulated in contact with fluid in the form of dye liquor. The cloth rope is circulated through the vessel 12 and a super-structure 14 above the vessel by a driven cloth reel rotatably mounted in an upper housing 16 that is connected to the vessel 12 by pipes 18 and 20 through which the cloth rope is circulated. A liquid jet or venturi is mounted in a section 22 of one of the pipes 20, with the treating liquor being introduced through an intake conduit 24 into the venturi section 22 to cause the liquor to flow through the section and cause a venturi effect that propels the cloth rope down into the vessel 12 and subjects the cloth rope to the dye liquor for dyeing thereof.

The treating dye liquor is discharged from the vessel 12 through a discharge pipe 26 communicating with the bottom of the vessel 12 for removal of the liquor for conditioning and recirculation into the vessel 12 through the venturi section 22. This recirculation is effected by a pump 28 connected to the discharge pipe 26 and communicating with a heat exchanger 30 from which the reconditioned liquor flows through the intake conduit 24 into the venturi section 22.

Disposed between the pump 28 and heat exchanger 30 for flow of the liquor therethrough is the filtering chamber 32 of the self-cleaning filtering apparatus 10 of the preferred embodiment of the present invention. This filtering chamber communicates with the pump 28 through the output conduit 34 of the pump 28 and communicates with the heat exchanger 30 through a connecting conduit 36.

The filtering chamber 32 is cylindrical in shape and disposed with its axis extending generally horizontally. One end of the chamber 30 is closed by a removable cover plate 38 attached by removable wing nut and pivotal bolt connections 40, with the output conduit 34 of the pump 28 opening into the filtering chamber 32 adjacent the cover plate 38. The connecting conduit 36 is connected to the end 42 of the chamber 32 opposite the cover plate 38 and extends as an "L" to the heat exchanger 30.

Mounted within the filtering chamber 32 is a cylindrical filter element 44 that is of lesser outer diameter than the interior diameter of the filtering chamber 32 to provide an annular plenum 46 therebetween. This filter element 44 has a bracket 48 of strip material projecting forwardly into contact with the cover plate 38 to properly position the filter element 44 in the chamber 32 with the opposite end 50 of the filter element 44 seated against projecting posts 52 in the end 42 of the chamber 32 opposite the cover plate. The posts 52 serve to space the filter element from the end of the chamber to permit flow of liquor from the annular plenum 46 into the connecting conduit 36. Tapered guide ribs 53 are mounted near the bottom of the chamber 32 adjacent the posts 52 and project upwardly to guide insertion of the filter element 44 into the chamber 32 to seat against the posts 52.

The end 54 of the filter element adjacent the opening of the output conduit 34 of the pump 28 into the filtering chamber 32 is open to permit liquor to flow into the interior of the filter element 44. An annular spacer 56 supports this end 54 of the filter element 44 in axial disposition and at a spacing from the filtering chamber 32. This annular spacer 56 also serves to close the adjacent end of the annular plenum 46 so that dye liquor entering from the output conduit 34 of the pump 28 into the chamber 32 will not pass directly into the plenum 46, but must pass into the interior of the filter element 44. The opposite end 50 of the filter element 44 is covered by a closure plate 58 to prevent dye liquor from discharging directly to the connecting conduit 36 without passing through the wall 60 of the filter element 44.

The cylindrical wall 60 of the filter element 44 is formed of perforated sheet metal with reinforcing rings 62 spaced along its length. The perforations 64 in the wall 60 are sufficiently large to allow substantially unobstructed flow of the dye liquor therethrough while being of sufficiently small size to obstruct flow of textile fabric lint therethrough, thereby filtering undesirable lint from the recirculating dye liquor.

Mounted within the cylindrical wall 60 of the filter element 44 is the annular head 66 of a cleaning member 68. This head 66 has an annular peripheral surface 70 facing and closely adjacent the interior of the filter element 44. An annular opening 72 is provided in the peripheral surface 70 for flow thereinto of dye liquor and lint from the adjacent surface of the filter element 44. The annular opening 72 communicates with an enlarged annular chamber 74 in the head 66, through which annular chamber 74 the lint containing dye liquor passes through radially extending hollow spokes 76 that extend inwardly to the hub 78 of the head 66 to provide for flow of the lint containing dye liquor to the interior of the hub 78.

The head 66 is fixed by threaded connection 80 to the end of a tube 82, with a radial flange 83 projecting from the hub 78 for locking with a corresponding flange on the tube 82 to prevent unthreading of the parts. The tube 82 extends from the head 66 axially within the filter element 44 and filtering chamber 32 through a sealing gland 84 and through a cylindrical enclosure pipe 86 that extends from the filter element wall 60 and through the "L" of the connecting conduit 36. The tube 82 has an open outer end 88 disposed in the enclosure pipe 86 for flow of lint containing dye liquor from the tube 82 into the enclosure pipe 86. This pipe 86 is formed with a "T" connection 90 that is connected to a return conduit 92 that extends to the end wall of the vessel 12, through the end wall and downwardly toward the center of the vessel 12 to a flanged end 94 around which is clamped the open end of a textile fabric bag 96. The bag 96 allows the dye liquor to flow therethrough while preventing lint from flowing therethrough, and is of sufficient size to permit operation during a full cycle of the dyeing process without accumulating sufficient lint to significantly reduce the liquor flow below desired operating levels. The bag 96 is effectively disposed in the vessel 12 above the perforated divider wall 98 under which the cloth rope is circulated. Thus, the bag is separated from possible entanglement with the cloth rope while the dye liquor filtering through the bag 96 is free to mix with the other dye liquor in the vessel 12 and be recirculated and conditioned therewith without loss of total dye liquor in the system.

The aforementioned enclosure pipe 86 extends through a tubular extension from the "L" of the connecting conduit 36 for sealing support between flanges 100 that position the enclosure pipe 86 and prevent dye liquor to escape through the flange connection 100. The enclosure pipe 86 extends exteriorly beyond the flange connection 100 to the aforementioned "T" connection and therebeyond to an outer end 102.

The aforementioned tube 82 of the cleaning member 68 has secured to its open end 88 a cylindrical rod 104 of substantially lesser diameter than the interior of the tube 82 so that dye liquor can pass from the interior of the tube 82 into the interior of the enclosure pipe 86 without interference. For this purpose, the open end 88 of the tube 82 is inclined to provide an enlarged elliptical opening that results in the rod 104 occupying less of the area of the opening than would be the case were the opening formed circularly perpendicular to the axis. The rod 104 extends through the enclosure pipe 86 and through the outer end 102 thereof, at which end a sealing gland 106 prevents escape of dye liquor while permitting reciprocation of the rod 104.

The rod 104 has an outer end 108 that is attached by a connector block 110 to the outer end of a piston rod 112 of a pneumatic piston/cylinder mechanism 114, which is mounted on a support platform that also supports the portion of the enclosure pipe 86 that is exterior of the connecting conduit 36. Air lines 118 are connected to the piston/cylinder mechanism through controls (not shown) to cause reciprocation of the piston rod 112 and attached rod 104, tube 82 and head 66 of the cleaning member 68. The stroke of the piston/cylinder mechanism 114 is of a length to reciprocate the cleaning member head 66 along substantially the full length of the perforated cylindrical wall 60 of the filter element 44.

The cleaning member head 66 is maintained at a substantially uniform annular spacing from the filter element wall 60 for effective cleaning and for minimal resistance to movement by a plurality of rollers 120 mounted on brackets 122 that project from the side of the head 66 facing the cover plate 38. The brackets 122 mount the rollers 120 so that the outer periphery of the plurality of rollers is at a diameter substantially equivalent to the inner diameter of the cylindrical filter element wall 60 for support of the head 66 during the reciprocal motion within the filter element 44.

In operation, dye liquor containing contaminant lint enters the filtering chamber 32 through the pump conduit 34 and passes into the interior of the filter element 44 with the cleaning member head 66 being open between the radial spokes 76 so that the dye liquor can pass freely into the full extent of the filter element 44. The dye liquor passes through the perforated wall 60 of the filter element 44 with the lint carried by the dye liquor being obstructed in the perforations 64 and accumulating on the interior surface of the cylindrical wall 60 of the filter element 44 until cleaned by reciprocation of the cleaning member 68 by the piston/cylinder mechanism 114. This reciprocation can be set by controls (not shown) in any conventional manner to occur periodically or it can be controlled in response to the pressure drop across the filter or the amount of dye liquor flowing through the filtering apparatus to reciprocate when cleaning is appropriate.

During cleaning reciprocation of the cleaning member 68, the dye liquor flows over the annular surface 70 of the cleaning member head 66 and into the annular opening 72, and also backflows through the adjacent perforations in the filter element 44, drawing with it lint that has accumulated on the adjacent filter element wall 60 to clean the filter element of lint in a self-cleaning operation. The dye liquor containing the lint contaminant passing into the annular opening 72 enters the annular chamber 74 in the head and passes through the spokes 76 and hub 78 into the tube 82, through which it passes into the enclosure pipe 86 and return conduit 92 into the bag 96, with the dye liquor passing through the bag 96 into the vessel 12 while the bag serves as a collector to obstruct flow of the lint therethrough. At the end of a dye cycle the bag 96 can be unclamped and disposed of while a clean bag is attached for filtering during the next dye cycle.

The apparatus takes advantage of the pressure differential normally available in piece dyeing machines between the pressure at the discharge of the pump 28 and the pressure in the vessel 12, which may be atmospheric. In a typical installation the pressure at different points in the circulating system is a pump discharge pressure 30 PSI, a filter entry pressure of 30 PSI, a filter exit pressure of 29 PSI, a heat exchanger exit and jet pressure of 28 PSI, and a kier or vessel pressure of 0 PSI. Thus, no auxiliary pump or other flow producing mechanism is required to cause the self-cleaning flow of dye liquor through the cleaning member 68 back into the vessel 12.

The bag 96 may typically be made of tubular knitted textile fabric, which would be available in most textile mills as scrap material to be inexpensively disposed of when removed at the end of the dye cycle. Although bags have been used in the cartridge of conventional filters, the present use of bags is substantially different from that in conventional usage. In conventional usage the bag is constrained in a relatively small container, thus limiting the area available for filtration. In the present invention the bag is able to expand, change its shape and open up its mesh to allow passage of liquor, while retaining its ability to trap fibers. Importantly, in conventional usage the full delivery volume of the pump and circulating liquor passes through the filter, whereas in the present invention only a small fraction, e.g., 1/50, of the full volume passes through the bag.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A self-cleaning filtering apparatus for use in a material treating system of the type having a vessel in which material is subjected to treatment by fluid that is recirculated and conditioned for reuse by fluid circulating and conditioning means, said apparatus comprising: means defining a filtering chamber disposed in said circulating and conditioning means for circulation of said fluid therethrough; a filter element disposed in said chamber for passage of said fluid through said filter element to filter particulate contaminants from said fluid onto said filter element; a cleaning member having means defining a passage therein with an opening facing said filter element; means for traversing said cleaning member across the upstream surface of said filter element to allow particulate contaminants on said filter element to flow into the opening of said passage defining means of said cleaning member, thereby cleaning contaminants from said filter element; conduit means communicating with said passage and with the interior of said vessel for passage of contaminant containing fluid through said cleaning member and conduit means and into said vessel; and a contaminant collector in said vessel connected to said conduit means for discharge thereinto of said contaminant containing fluid, said collector being fluid-permeable and substantially contaminant impermeable for passage of fluid therethrough into said vessel and for collection of said contaminants in said collector.

2. A self-cleaning filtering apparatus according to claim 1 and characterized further in that the size of the passage in said cleaning member is relatively small in comparison with the flow of fluid through the filtering chamber so that only a relatively small porportion of the recirculating fluid is diverted through said cleaning member into said collector, and said collector is sufficiently large to collect contaminant during at least one full cycle of operation of said material treating system without substantially obstructing flow of fluid through said collector.

3. A self-cleaning filtering apparatus according to claim 1 and characterized further in that said apparatus includes means providing a fluid pressure at said filtering chamber greater than the pressure within said vessel with the pressure differential causing flow of contaminant containing fluid through said filter element and conduit means into said collector.

4. A self-cleaning filtering apparatus according to claim 1 and characterized further in that said collector is in the form of a bag of flaccid material having means defining an opening into which said conduit means discharges contaminant containing fluid.

5. A self-cleaning filtering apparatus according to claim 4 and characterized further in that said collector is a disposable bag of textile fabric material.

6. A self-cleaning filtering apparatus for use in a material treating system according to claim 1 in which the system is a textile processing system that inherently produces lint as a particulate contaminant in the recirculating treating fluid, and characterized further in that said filter element is perforated to permit passage of fluid therethrough and to obstruct passage of lint therethrough.

7. A self-cleaning filtering apparatus according to claim 6 and characterized further in that the size of the passage in said cleaning member is relatively small in comparison with the flow of fluid through the filtering chamber so that only a relatively small proportion of the recirculating fluid is diverted through said cleaning member into said collector, and said collector is sufficiently large to collect lint during at least one full cycle of operation of said textile processing system without substantially obstructing flow of fluid through said collector.

8. A self-cleaning filtering apparatus according to claim 6 and characterized further in that said apparatus includes means providing a fluid pressure at said filtering chamber greater than the pressure within said vessel with the pressure differential causing flow of lint containing fluid through said filter element and conduit means into said collector.

9. A self-cleaning filtering apparatus according to claim 6 and characterized further in that said collector is in the form of a bag of flaccid material having means defining an opening into which said conduit means discharges lint containing fluid.

10. A self-cleaning filtering apparatus according to claim 9 and characterized further in that said collector is a disposable bag of textile fabric material that can be disposed of at the end of a processing cycle and replaced by a clean bag.

11. A self-cleaning filtering apparatus according to claim 1 and characterized further in that said filter element is cylindrical and has an open end through which contaminant containing fluid flows into the interior of the element for filtering passage of fluid through the cylindrical surface of said element into said chamber exteriorly of said element with the contaminant retained on said element; said cleaning member including an annular head having an annular peripheral surface facing and closely adjacent the interior of said cylindrical filter element and having an axially extending tube connected to said head and extending exteriorly of said chamber for reciprocating actuation by said traversing means, said means defining said opening being provided in the peripheral surface of said head and said passage being formed in said tube and communicating with said opening for flow of contaminant containing fluid through said opening and passage to said conduit means exteriorly of said chamber.

12. A self-cleaning filtering apparatus according to claim 11 and characterized further in that said filtering chamber and said means for traversing are disposed exteriorly of said vessel, and said conduit means extends into said vessel to said interiorly disposed collector.

13. A self-cleaning filtering apparatus according to claim 11 and characterized further in that the size of the passage in said cleaning member is relatively small in comparison with the flow of fluid through the filtering chamber so that only a relatively small proportion of the recirculating fluid is diverted through said cleaning member into said collector, and said collector is sufficiently large to collect contaminant during at least one full cycle of operation of said material treating system without substantially obstructing flow of fluid through said collector.

14. A self-cleaning filtering apparatus according to claim 11 and characterized further in that said apparatus includes means providing a fluid pressure at said filtering chamber greater than the pressure within said vessel with the pressure differential causing flow of contaminant containing fluid through said filter element and conduit means into said collector.

15. A self-cleaning filtering apparatus according to claim 11 and characterized further in that said collector is in the form of a bag of flaccid material having means defining an opening into which said conduit means discharges contaminant containing fluid.

16. A self-cleaning filtering apparatus according to claim 15 and characterized further in that said collector is a disposable bag of textile fabric material.

17. A self-cleaning filtering apparatus for use in a material treating system according to claim 11 in which the system is a textile processing system that inherently produces lint as a particulate contaminant in the recirculating treating fluid, and characterized further in that said filter element is perforated to permit passage of fluid therethrough and to obstruct passage of lint therethrough.

18. A self-cleaning filtering apparatus according to claim 17 and characterized further in that the size of the passage in said cleaning member is relatively small in comparison with the flow of fluid through the filtering chamber so that only a relatively small proportion of the recirculating fluid is diverted through said cleaning member into said collector, and said collector is sufficiently large to collect lint during at least one full cycle of operation of said textile processing system without substantially obstructing flow of fluid through said collector.

19. A self-cleaning filtering apparatus according to claim 17 and characterized further in that said apparatus includes means providing a fluid pressure at said filtering chamber greater than the pressure within said vessel with the pressure differential causing flow of lint containing fluid through said filter element and conduit means into said collector.

20. A self-cleaning filtering apparatus according to claim 17 and characterized further in that said collector is in the form of a bag of flaccid material having means defining an opening into which said conduit means discharges lint containing fluid.

21. A self-cleaning filtering apparatus according to claim 20 and characterized further in that said collector is a disposable bag of textile fabric material that can be disposed of at the end of a processing cycle and replaced by a clean bag.

* * * * *

UNITED STATES PATENT OFFICE
CERTIFICATE OF CORRECTION

Patent No. 4,532,036      Dated July 30, 1985

Inventor(s) Graham F. Clifford

It is certified that error appears in the above-identified patent and that said Letters Patent are hereby corrected as shown below:

Column 2, Line 13, delete "at" and insert therefor -- as --.
Column 3, Line 8, after "be" add -- used --.
Column 3, Line 25, delete "pssage" and insert therefor -- passage --.
Column 3, Line 31, delete "Conduits" and insert therefor -- Conduit --.
Column 3, Line 58, delete "sysftems" and insert therefor -- systems --.
Column 9, Line 5, delete "porportion" and insert therefor -- proportion --.

Signed and Sealed this

Fourth Day of March 1986

[SEAL]

Attest:

DONALD J. QUIGG

Attesting Officer      Commissioner of Patents and Trademarks